(12) United States Patent
Hirota et al.

(10) Patent No.: US 8,935,023 B2
(45) Date of Patent: Jan. 13, 2015

(54) SECONDARY BATTERY SYSTEM AND VEHICLE HAVING SECONDARY BATTERY SYSTEM

(75) Inventors: Yasuki Hirota, Aichi-ken (JP); Shuji Tomura, Nagoya (JP); Takaji Umeno, Nisshin (JP); Takashi Shimazu, Nagoya (JP)

(73) Assignee: Kabushiki Kaisha Toyota Chuo Kenkyusho, Aichi-ken (JP)

( * ) Notice: Subject to any disclaimer, the term of this patent is extended or adjusted under 35 U.S.C. 154(b) by 684 days.

(21) Appl. No.: 12/656,184

(22) Filed: Jan. 20, 2010

(65) Prior Publication Data

US 2010/0191398 A1 Jul. 29, 2010

(30) Foreign Application Priority Data

Jan. 26, 2009 (JP) .................. 2009-013836

(51) Int. Cl.
| | |
|---|---|
| *B60L 11/00* | (2006.01) |
| *B60L 11/18* | (2006.01) |
| *B60W 10/08* | (2006.01) |
| *B60W 30/18* | (2012.01) |
| *H01M 10/48* | (2006.01) |
| *H01M 10/613* | (2014.01) |
| *H01M 10/615* | (2014.01) |
| *H01M 10/625* | (2014.01) |
| *H01M 10/633* | (2014.01) |
| *H01M 10/6571* | (2014.01) |
| *H01M 10/659* | (2014.01) |
| *H01M 10/6595* | (2014.01) |
| *H01M 10/66* | (2014.01) |

(52) U.S. Cl.
CPC ........... *B60L 11/1851* (2013.01); *B60L 11/187* (2013.01); *B60W 10/08* (2013.01); *B60W30/18127* (2013.01); *H01M 10/486* (2013.01); *H01M 10/5004* (2013.01); *H01M 10/5006* (2013.01); *H01M 10/5016* (2013.01); *H01M 10/5022* (2013.01); *H01M 10/5083* (2013.01); *H01M 10/5089* (2013.01); *H01M 10/5091* (2013.01); *H01M 10/5093* (2013.01); *B60L 2260/56* (2013.01); *B60L 2270/44* (2013.01); *B60W 2510/244* (2013.01); *B60W 2510/246* (2013.01); *Y02T 10/7005* (2013.01); *Y02T 1/705* (2013.01)
USPC .......................................................... 701/22

(58) Field of Classification Search
CPC ............ B60L 11/1851; B60L 11/1859; B60L 11/1861; B60L 11/1862; B60L 11/1864; B60L 11/1866; B60L 11/1868; B60L 11/187; B60L 11/1872; B60L 11/1874; B60L 11/1875; B60L 11/1877; B60L 11/1879; B60L 7/00; B60L 7/003; B60L 7/006; B60L 7/02; B60L 7/04; B60L 7/06; B60L 7/08; B60L 7/10; B60L 7/12; B60L 7/14; B60L 7/16; B60L 7/18; B60L 7/20; B60L 7/22; B60L 7/24; B60L 7/26; B60W 2510/24; B60W 2510/242; B60W 2510/244; B60W 2510/246; B60W 30/18127; B60W 30/18136; H01M 10/44; H01M 10/441; H01M 10/50; H01M 10/5002; H01M 10/5004; H01M 10/5006; H01M 10/5016; H01M 10/5081; H01M 10/5083; H01M 10/5085; H01M 10/5087; H01M 10/5089; H01M 10/5091; H01M 10/5093; H01M 10/5095; H01M 10/5097; H01M 2200/10; H01M 2220/20; H02J 7/1438; H02J 7/1453; Y02E 60/14; Y02E 60/142; Y02E 60/145; Y02T 10/166; Y02T 10/6282; Y02T 10/7005; Y02T 10/7011; Y02T 10/7016; Y02T 10/7027; Y02T 10/7033; Y02T 10/7038; Y02T 10/7044; Y02T 10/7072; Y02T 10/7077; Y02T 10/7083; Y10S 903/907; Y10S 903/947

USPC .................................. 701/22; 180/65.275, 65.29
See application file for complete search history.

(56) References Cited

U.S. PATENT DOCUMENTS

| | | | |
|---|---|---|---|
| 5,291,960 A * | 3/1994 | Brandenburg et al. | 180/65.27 |
| 5,490,572 A * | 2/1996 | Tajiri et al. | 180/65.1 |
| 6,353,306 B1 * | 3/2002 | Mixon | 320/160 |
| 2006/0028167 A1 * | 2/2006 | Czubay et al. | 320/104 |

FOREIGN PATENT DOCUMENTS

| | | |
|---|---|---|
| JP | A-06-024238 | 2/1994 |
| JP | A-06-319205 | 11/1994 |
| JP | A-2000-059918 | 2/2000 |
| JP | A-2005-083318 | 3/2005 |
| JP | A-2005-130629 | 5/2005 |
| JP | A-2008-230508 | 10/2008 |
| JP | A-2008-290636 | 12/2008 |

OTHER PUBLICATIONS

Japanese Office Action in Japanese Patent Application No. 2009-013836; dated Sep. 14, 2010 (with English-language translation).

* cited by examiner

*Primary Examiner* — Jerrah Edwards (74) *Attorney, Agent, or Firm* — Oliff PLC (57) ABSTRACT

A secondary battery system comprises a secondary battery which receives regenerative electric power from a motor, a heat storage unit (heat storage device) which converts a part of electric power stored in the secondary battery or the regenerative electric power from the motor into heat and stores the heat, and which supplies the stored heat to the secondary battery when a temperature of the secondary battery is less than a low-temperature-side threshold value which is set in advance when the electric power is extracted from the secondary battery, and an electric power distribution controller (ECU) which distributes the regenerative electric power from the motor to the secondary battery and the heat storage unit (heat storage device) when the temperature of the secondary battery is less than the low-temperature-side threshold value when the secondary battery receives the regenerative electric power from the motor.

13 Claims, 8 Drawing Sheets

SECONDARY BATTERY SYSTEM AND VEHICLE HAVING SECONDARY BATTERY SYSTEM

PRIORITY INFORMATION

This application claims priority to Japanese Patent Application No. 2009-013836, filed on Jan. 26, 2009, which is incorporated herein by reference in its entirety.

TECHNICAL FIELD

The present invention relates to a secondary battery system and to a vehicle having a secondary battery system.

BACKGROUND ART

Vehicles such as a hybrid vehicle and an electric automobile are mounted with a large-capacity secondary battery for driving a motor. In the secondary battery, because the electric characteristic is reduced under a low-temperature environment, the capacity which can be charged and discharged is substantially reduced. In particular, because the electrolyte solution in a lithium ion secondary battery has high viscosity, internal resistance is increased under a low-temperature environment, and sufficient performance cannot be achieved.

In consideration of the above, in order to improve the battery characteristic under low-temperature environments, a system for warming the secondary battery is proposed (in, for example, JP 2008-290636 A and JP 2008-230508 A).

SUMMARY

Technical Problem

Among general methods of warming the secondary battery, there is known a method in which the electric power of the secondary battery is supplied to a heater and the secondary battery is warmed. In this method, however, a part of the electric power stored in the secondary battery is consumed. In addition, in the low-temperature environment, the electric characteristic of the secondary battery is reduced, and, thus, it may not be possible to always extract the electric power to be supplied to the heater from the secondary battery.

Another method is known in which exhaust gas of the engine is supplied to the secondary battery to heat the secondary battery. In this method, however, in order to prevent condensation on the surface of the battery casing, the water vapor in the exhaust gas must be removed, or heat exchange to another heat exchanging medium is required, which results in complexity of the system and increased cost.

An advantage of the present invention is provision of a secondary battery system and a vehicle having the secondary battery system in which the secondary battery can be warmed without wastefully consuming electric power and the necessary electric power can be extracted from the secondary battery even under the low-temperature environment.

Solution to Problem (1) According to one aspect of the present invention, there is provided a secondary battery system comprising a secondary battery which receives regenerative electric power from a motor, a heat storage unit which converts apart of electric power stored in the secondary battery or the regenerative electric power from the motor into heat and stores the heat, and which supplies the stored heat to the secondary battery when a temperature of the secondary battery is less than a low-temperature-side threshold value which is set in advance when electric power is extracted from the secondary battery, and an electric power distribution controller which distributes the regenerative electric power from the motor to the secondary battery and the heat storage unit when the temperature of the secondary battery is less than the low-temperature-side threshold value when the secondary battery receives the regenerative electric power from the motor.

(2) According to another aspect of the present invention, it is preferable that the secondary battery system of (1) further comprises a cooling-energy and warming-heat generation unit which converts thermal energy stored in the heat storage unit and generates cooling energy or which amplifies the thermal energy and generates warming heat, wherein the cooling-energy and warming-heat generation unit supplies the warming heat to the secondary battery when the temperature of the secondary battery is less than the low-temperature-side threshold value which is set in advance, and supplies the cooling energy to the secondary battery when the temperature of the secondary battery is greater than or equal to a high-temperature-side threshold value which is set in advance.

(3) According to another aspect of the present invention, there is provided a vehicle comprising a motor which runs the vehicle, a secondary battery which receives regenerative electric power from the motor, a heat storage unit which converts a part of electric power stored in the secondary battery or the regenerative electric power from the motor into heat and stores the heat, and which supplies the stored heat to the secondary battery when a temperature of the secondary battery is less than a low-temperature-side threshold value which is set in advance when electric power is extracted from the secondary battery, and an electric power distribution controller which distributes the regenerative electric power from the motor to the secondary battery and the heat storage unit when the temperature of the secondary battery is less than the low-temperature-side threshold value when the secondary battery receives the regenerative electric power from the motor.

(4) According to another aspect of the present invention, it is preferable that the vehicle of (3) further comprises a cooling-energy and warming-heat generation unit which converts thermal energy stored in the heat storage unit and generates cooling energy or amplifies the thermal energy and generates warming heat, wherein the cooling-energy and warming-heat generation unit supplies the warming heat to the secondary battery when the temperature of the secondary battery is less than the low-temperature-side threshold value which is set in advance, and supplies the cooling energy to the secondary battery when the temperature of the secondary battery is greater than or equal to a high-temperature-side threshold value which is set in advance.

(5) According to another aspect of the present invention, it is preferable that the vehicle of (4) further comprises an amount-of-electric-power controller which supplies a part of the electric power of the secondary battery to the heat storage unit based on a usage frequency of the vehicle and the temperature of the secondary battery when the vehicle is stopped, wherein the amount-of-electric-power controller supplies a part of the electric power of the secondary battery to the heat storage unit when the temperature of the secondary battery is greater than or equal to a threshold value which is set in advance and the usage frequency of the vehicle is less than a threshold value which is set in advance, when the vehicle is stopped.

(6) According to another aspect of the present invention, it is preferable that the vehicle of any one of (3)~(5) further comprises a state of charge detecting unit which detects an amount of remaining electric power of the secondary battery, wherein the electric power distribution controller distributes the regenerative electric power from the motor to the heat storage unit when the amount of remaining electric power of the secondary battery detected by the state of charge detecting unit is greater than or equal to a threshold value which is set in advance.

(7) According to another aspect of the present invention, it is preferable that the vehicle according to any one of (3)~(5) further comprises an electric power supply unit which supplies electric power to the secondary battery and the heat storage unit, and a prediction unit which predicts a usage frequency of the heat storage unit based on a temperature history of the secondary battery, wherein, when the usage frequency of the heat storage unit predicted by the prediction unit is less than a threshold value which is set in advance, the electric power distribution controller limits supply of electric power to the secondary battery and the heat storage unit by the electric power supply unit, and distributes the regenerative electric power from the motor to the heat storage unit.

Advantageous Effects of the Invention

According to various aspects of the present invention, the secondary battery can be warmed without wastefully consuming electric power, and necessary electric power can be extracted from the secondary battery even under a low-temperature environment.

DESCRIPTION OF EMBODIMENTS

Preferred embodiments of the present invention will now be described in detail. The preferred embodiments are merely examples of practicing the present invention, and the present invention is not limited to the preferred embodiments described herein.

Figure 1:
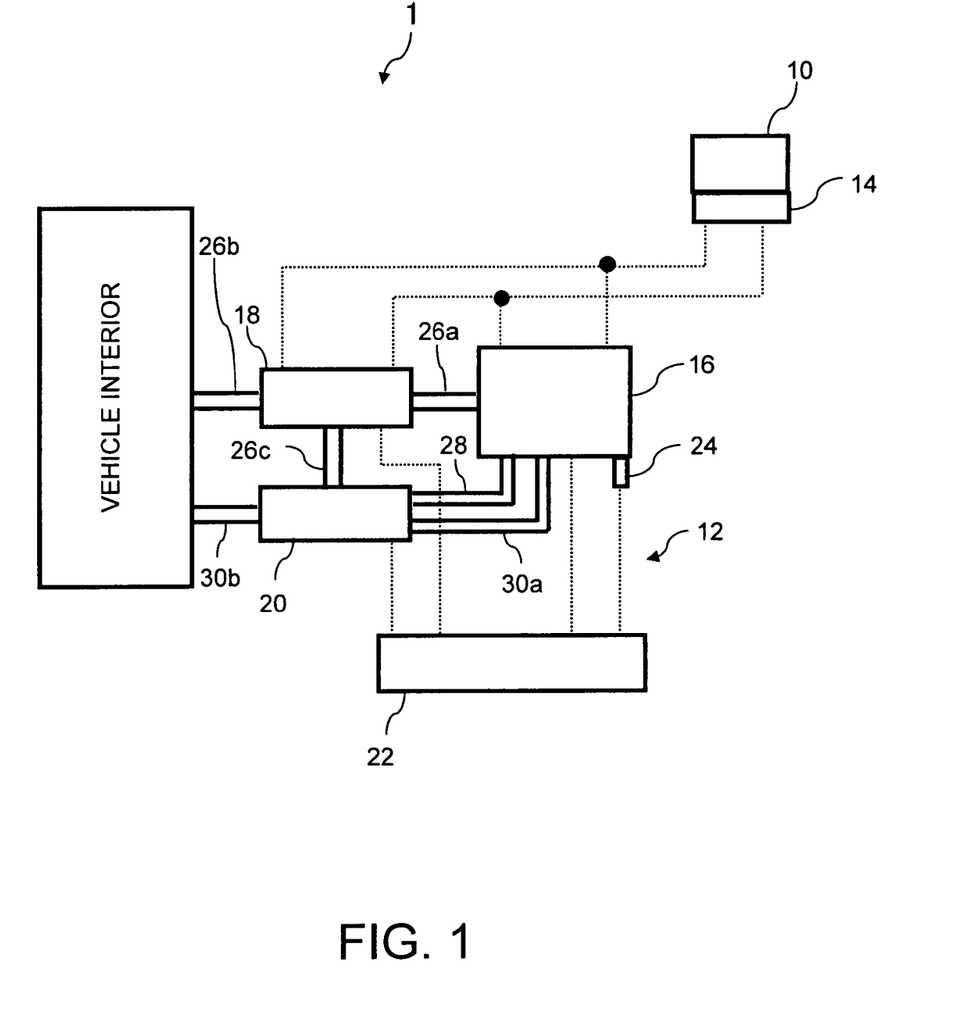
FIG. 1 is a schematic diagram showing an example structure of a vehicle according to a preferred embodiment of the present invention.

FIG. 1 is a schematic diagram showing an example structure of a vehicle according to a preferred embodiment of the present invention. A vehicle 1 shown in FIG. 1 is a hybrid vehicle, an electric automobile, or the like, and comprises a motor 10 for driving a car shaft, and a secondary battery system 12.

The motor 10 is driven by receiving supply of electric power from a secondary battery 16. The motor 10 is an AC synchronus motor which is driven by AC electric power, and is equipped with an inverter 14. The inverter 14 receives a DC current from the secondary battery 16, converts the DC current to an AC electric power, and supplies the AC electric power to the motor 10. The motor 10 primarily generates a driving force, but can also generate regenerative electric power using the rotation of the car shaft. The regenerative electric power generated by the motor 10 is charged to the secondary battery 16.

Next, a structure of the secondary battery system 12 of the present embodiment will be described. The secondary battery system 12 comprises the secondary battery 16, a heat storage device 18, a heat pump 20, an ECU 22, and a temperature sensor 24. The motor 10 and the secondary battery 16, the motor 10 and the heat storage device 18, and the secondary battery 16 and the heat storage device 18 are electrically connected to each other, respectively.

As the secondary battery 16, for example, various secondary batteries may be used, such as a lithium ion secondary battery, nickel metal hydride secondary battery, and lead secondary battery, but the lithium ion secondary battery is preferably used, because of its high capacity density.

No particular limitation is imposed on the structure of the heat storage device 18, so long as the heat storage device 18 converts electric power energy into thermal energy and supplies the converted heat to the vehicle interior, to the secondary battery 16, and to the heat pump 20. For example, for the heat storage device 18, there may be employed a structure in which an electric heater is combined with a device which stores heat while a chemical heat storage member such as calcium hydroxide causes a dehydration reaction and which supplies water vapor and generates heat by hydration when heat discharge is required. Heat supply lines 26a, 26b, and 26c are connected to the heat storage device 18, so that the heat generated by the heat storage device 18 can be supplied to the vehicle interior, the secondary battery 16, and the heat pump 20. No particular limitation is imposed on the structure of the heat pump 20, so long as the heat pump 20 converts thermal energy from the heat storage device 18 to generate cooling energy (cold) and amplifies the thermal energy, and, for example, a chemical heat pump, an adsorption heat pump, or the like may be used. A warming heat supply line 28, and cooling energy supply lines 30a and 30b are connected to the heat pump 20, so that the warming heat can be supplied to the secondary battery 16 and the cooling energy can be supplied to the vehicle interior and the secondary battery 16.

The temperature sensor 24 detects the temperature of the secondary battery 16 and transmits temperature data to the ECU 22, and is electrically connected to the ECU 22. The ECU 22 is constructed as a microprocessor with a CPU as a primary member, and includes, in addition to the CPU, a ROM which stores a processing program or the like, a RAM which temporarily stores data, and an input/output port.

The ECU 22 is electrically connected to the secondary battery 16 and the heat storage device 18, and can distribute the regenerative electric power from the motor 10 to the secondary battery 16 and the heat storage device 18, based on the temperature of the secondary battery 16 detected by the temperature sensor 24. More specifically, a low-temperature-side threshold value is stored in the ECU 22 in advance, and a control is applied such that, when the temperature detected by the temperature sensor 24 is less than the low-temperatureside threshold value, the regenerative electric power from the motor 10 is distributed to the secondary battery 16 and the heat storage device 18, and, when the temperature detected by the temperature sensor 24 is greater than or equal to the low-temperature-side threshold value, the regenerative electric power is distributed only to the secondary battery 16 (or a distribution ratio of regenerative electric power from the motor 10 is such that the distribution ratio to the secondary battery 16 is greater than that to the heat storage device 18). When the temperature of the secondary battery 16 is low, if all of the regenerative electric power from the motor 10 is to be charged to the secondary battery 16, an overvoltage would be increased in the secondary battery 16. In particular, in the lithium ion secondary battery, the increase in the overvoltage may cause Li deposition. In consideration of this, in the present embodiment, when the temperature of the secondary battery 16 is low, a part of the regenerative electric power from the motor 10 is supplied to the heat storage device 18. With this configuration, it is possible to inhibit waste of electric power and protect the secondary battery 16 at the same time even under a low-temperature environment. The low-temperature-side threshold value may be suitably set based on the type, capacity, electric characteristic, etc. of the secondary battery 16, but must be set to a temperature of the secondary battery 16 in which the overvoltage is increased in the secondary battery 16 during charging of the secondary battery 16 (for example, within a range of −30° C.~−20° C.).

In addition, when the electric power is extracted from the secondary battery 16 (that is, during discharge), if the temperature of the secondary battery 16 is low, the internal resistance would be increased, and, thus, it may not be possible to extract the electric power necessary for running the vehicle 1. Thus, in the present embodiment, when the temperature detected by the temperature sensor 24 is less than the low-temperature-side threshold value, the ECU 22 sends an operation instruction to the heat storage device 18, and the heat storage device 18 supplies the stored heat to the secondary battery 16, to warm the secondary battery 16. With this configuration, even under the low-temperature environment, the electric power necessary for running the vehicle 1 can be extracted from the secondary battery 16.

The supply of the heat to the secondary battery 16 may be achieved from the heat storage device 18 as described above, but, more preferably, the thermal energy from the heat storage device 18 is amplified by the heat pump 20 and the heat generated by the heat pump 20 is supplied to the secondary battery 16. More specifically, when the temperature detected by the temperature sensor 24 is less than the low-temperature-side threshold value, the ECU 22 sends an operation instruction to the heat storage device 18 and the heat pump 20, so that the heat stored in the heat storage device 18 is amplified by the heat pump 20 and supplied to the secondary battery 16. With this configuration, the secondary battery 16 can be warmed more efficiently.

On the other hand, when the temperature of the secondary battery 16 is increased, side reactions may occur in the battery, and the battery may be degraded. In consideration of this, in the present embodiment, a high-temperature-side threshold value is stored in the ECU 22 in advance, and, when the temperature detected by the temperature sensor 24 is greater than or equal to the high-temperature-side threshold value, the ECU 22 sends operation instructions to the heat storage device 18 and the heat pump 20 so that the thermal energy stored in the heat storage device 18 is converted by the heat pump 20, the cooling energy is generated, and the cooling energy is supplied to the secondary battery 16. With this configuration, the secondary battery 16 can be cooled, to thereby inhibit the side reactions in the secondary battery 16 and inhibit degradation of the battery. The high-temperature-side threshold value may be suitably set based on the type, capacity, electric characteristic, etc. of the secondary battery 16, but must be set to a temperature of the secondary battery 16 in which the side reactions are caused in the charging/discharging reaction of the secondary battery 16 (for example, within a range of 60° C.~80° C.).

Figure 2:
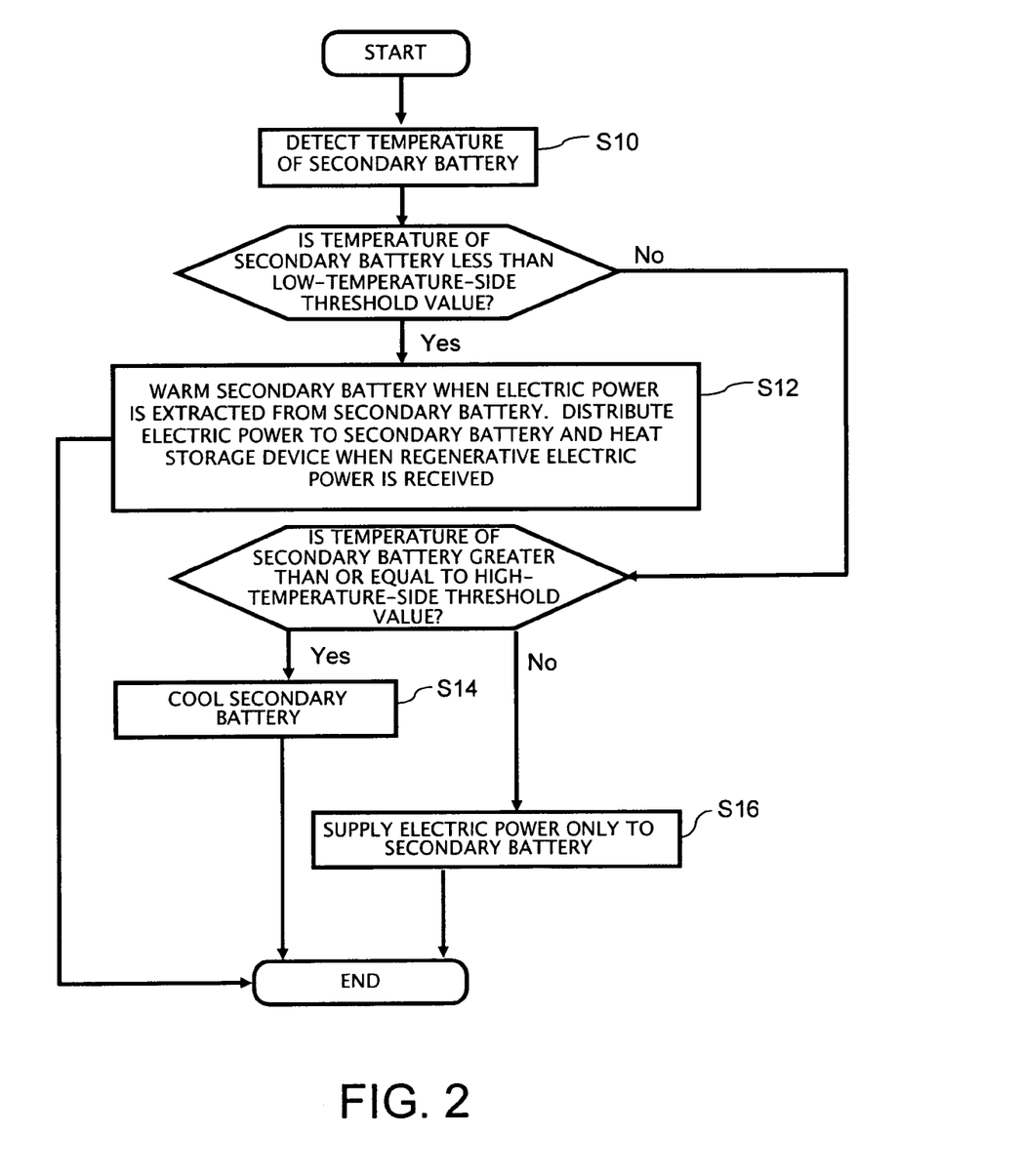
FIG. 2 is a flowchart showing an example operation of a secondary battery system according to a preferred embodiment of the present invention.

FIG. 2 is a flowchart showing an example operation of the secondary battery system of a preferred embodiment of the present invention. In step S10, the temperature of the secondary battery 16 is detected by the temperature sensor 24. The ECU 22 judges whether or not the detected temperature of the secondary battery 16 is less than the low-temperature-side threshold value which is stored in advance. In step S12, when it is judged that the temperature of the secondary battery 16 is less than the low-temperature-side threshold value, at the time when the electric power is to be extracted from the secondary battery 16, the heat storage device 18 and the heat pump 20 are operated, the warming heat is supplied to the secondary battery 16, and the secondary battery 16 is warmed. At the time when the secondary battery 16 receives the regenerative electric power from the motor 10, the ECU 22 distributes the regenerative electric power from the motor 10 to the secondary battery 16 and the heat storage device 18.

On the other hand, when the temperature of the secondary battery 16 is greater than or equal to the low-temperature-side threshold value, the ECU 22 judges whether or not the detected temperature of the secondary battery 16 is greater than or equal to the high-temperature-side threshold value which is stored in advance. In step S14, when it is judged that the temperature of the secondary battery 16 is greater than or equal to the high-temperature-side threshold value, the heat storage device 18 and the heat pump 20 are operated so that the thermal energy of the heat storage device 18 is converted by the heat pump 20, the cooling energy is generated, and the secondary battery 16 is cooled. In step S16, when the temperature of the secondary battery 16 is greater than or equal to the low-temperature-side threshold value and less than the high-temperature-side threshold value, at the time when the secondary battery 16 receives the regenerative electric power from the motor 10, the ECU 22 distributes and supplies the regenerative electric power to, for example, only the secondary battery 16.

Figure 3:
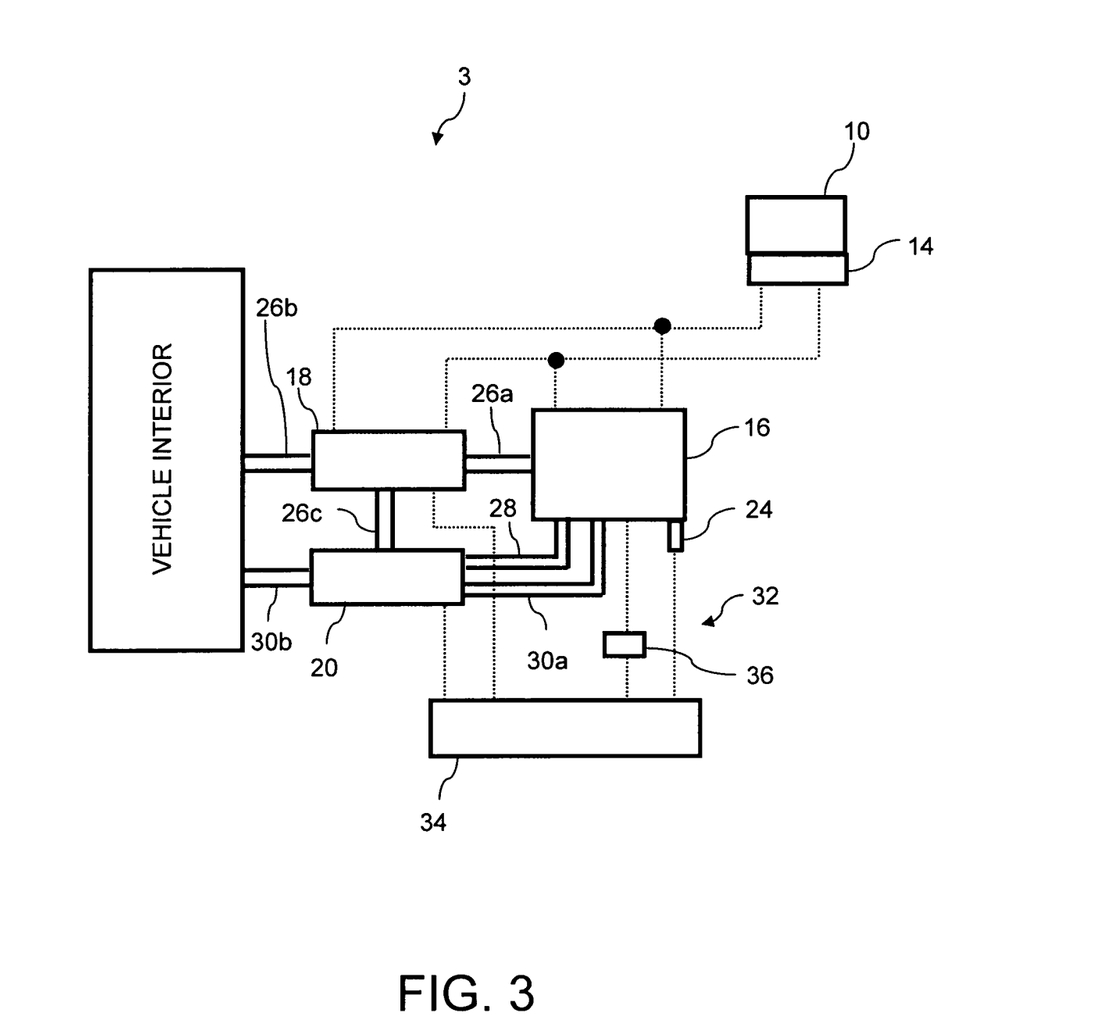
FIG. 3 is a schematic diagram showing an example structure of a vehicle according to another preferred embodiment of the present invention.

FIG. 3 is a schematic diagram showing an example structure of a vehicle according to another preferred embodiment of the present invention. In a vehicle 3 shown in FIG. 3, structures identical with those of the vehicle 1 shown in FIG. 1 are assigned the same reference numerals and will not be described again. An ECU 34 of a secondary battery system 32 shown in FIG. 3 has a function as an amount-of-electric-power controller which supplies a part of the electric power of the secondary battery 16 to the heat storage device 18 based on a usage frequency of the vehicle and the temperature of the secondary battery 16 at the time of stopping of the vehicle. The usage frequency of the vehicle is represented by, for example, a number of times of switching ON of the ignition key per day. It is judged that "the usage frequency is low" when the number of times of switching ON is less than a threshold value which is set in advance, and it is judged that "the usage frequency is high" when the number of times of switching ON is greater than the set threshold value.

If the electric power is stored in the secondary battery 16 for a long period of time in a state where the temperature of the secondary battery 16 is high at the time of stopping the secondary battery 16, the secondary battery 16 is degraded. In consideration of this, in the present embodiment, with the control function of the amount of electric power by the ECU 34, a part of the electric power stored in the secondary battery 16 is transferred to the heat storage device 18 when the temperature of the secondary battery 16 is greater than or equal to a high-temperature-side threshold value which is set in advance and the usage frequency of the vehicle is low. With such a configuration, it is possible to inhibit degradation of the secondary battery 16 at the time of high temperature.

When the electric power stored in the secondary battery 16 is transferred to the heat storage device 18, the amount of electric power transferred is preferably determined based on an amount of remaining electric power of the secondary battery 16. Specifically, a control is applied such that the amount-of-electric-power controller transfers, for example, 20% of the electric power to the heat storage device 18 when the amount of remaining electric power of the secondary battery 16 is 80% at the time of stopping of the vehicle, and transfers 10% of the electric power to the heat storage device 18 when the amount of remaining electric power of the secondary battery 16 is 70% at the time of stopping of the vehicle. In addition, when the amount of remaining electric power of the secondary battery 16 is 60% at the time of stopping of the vehicle, the supply of electric power from the secondary battery 16 to the heat storage device 18 is stopped. The amount of remaining electric power of the secondary battery 16 is detected by an state of charge detecting device 36 provided on the secondary battery system 32 shown in FIG. 3. More specifically, a current sensor and a voltage sensor are mounted on an output terminal of the secondary battery 16, and the state of charge detecting device 36 calculates the amount of remaining electric power from an output current, a battery voltage, etc., from the sensors. The state of charge detecting device 36 is electrically connected to the ECU 34, and the calculated state of charge data of the secondary battery 16 are transmitted to the ECU 34.

In addition, in the present embodiment, when the regenerative electric power from the motor 10 is received, if the amount of remaining electric power of the secondary battery 16 detected by the state of charge detecting device 36 is greater than or equal to a threshold value which is stored in the ECU 34 in advance and the temperature of the secondary battery is less than the low-temperature-side threshold value, the ECU 34 preferably applies a control so that the regenerative electric power is supplied to the heat storage device 18. With such a configuration, it is possible to more efficiently inhibit waste of electric power, and, at the same time, inhibit degradation of the secondary battery.

Figure 4:
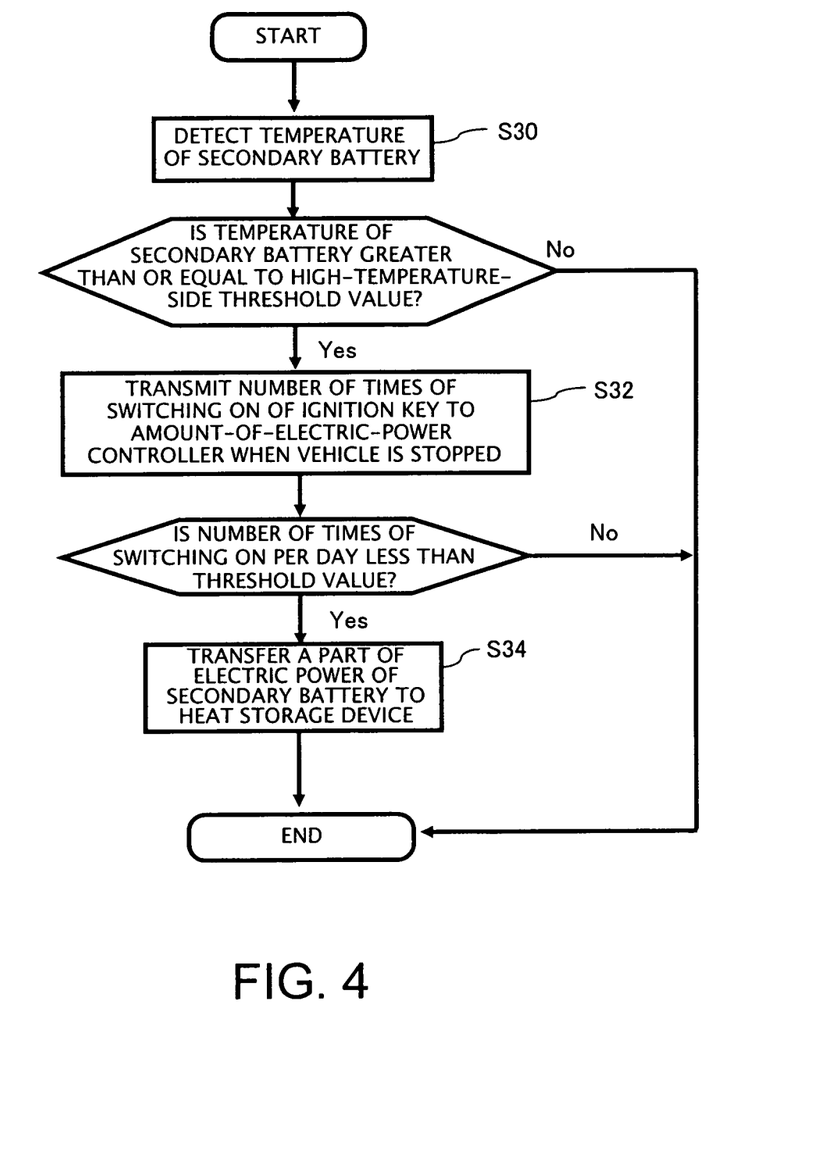
FIG. 4 is a flowchart showing an example operation of a secondary battery system according to a preferred embodiment of the present invention.

FIG. 4 is a flowchart showing an example operation of the secondary battery system according to the present embodiment. In step S30, the temperature of the secondary battery 16 is detected by the temperature sensor 24 when the vehicle stops. When the ECU 34 judges that the temperature of the secondary battery 16 is greater than or equal to the high-temperature-side threshold value which is set in advance, in step S32, a number of times of switching ON of the ignition key counted by a counter (not shown) is transmitted to the ECU 34 when the vehicle stops. The ECU 34 then judges whether or not the number of times of switching ON of the ignition key per day is less than a threshold value which is stored in advance. When the number of times of switching ON of the ignition key per day is less than the threshold value, it is judged that the usage frequency of the vehicle is low, and, in step S34, the ECU 34 transfers a part of the electric power stored in the secondary battery 16 to the heat storage device 18.

Figure 5:
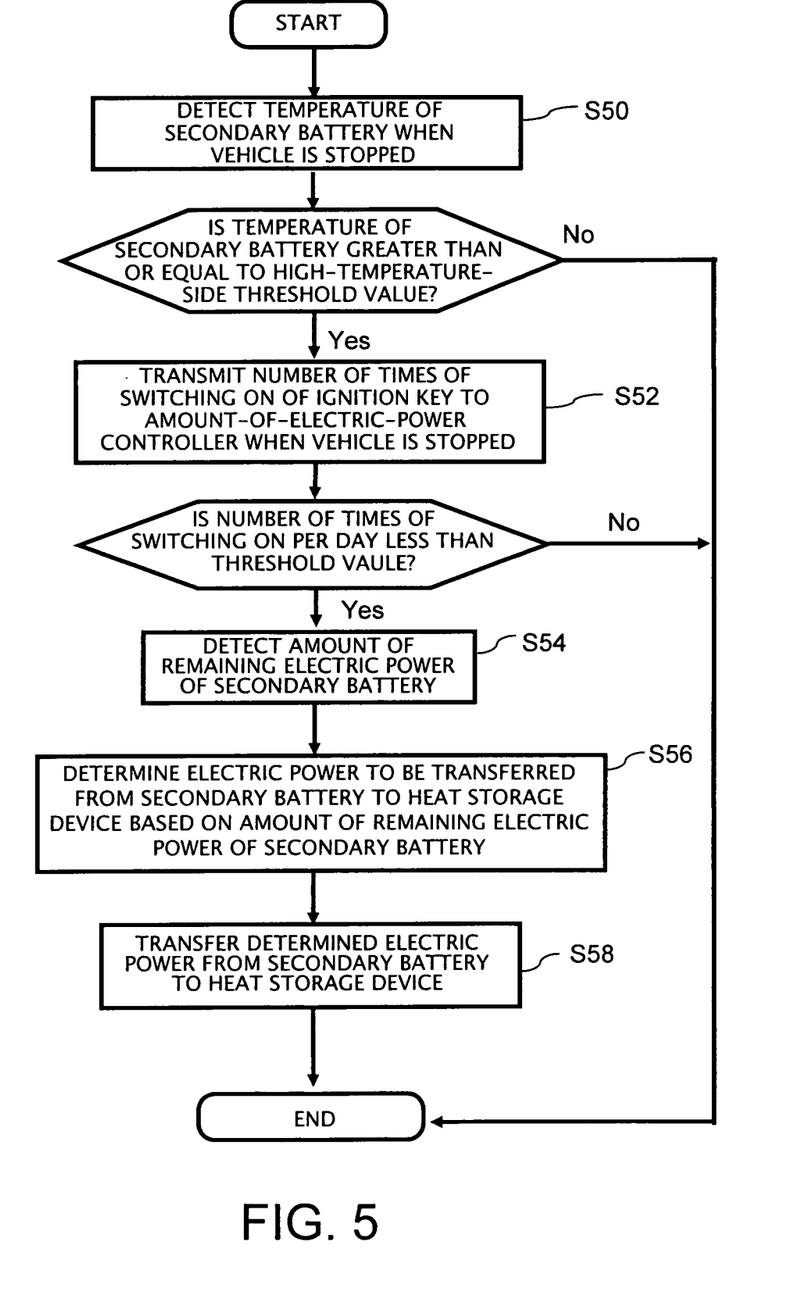
FIG. 5 is a flowchart showing another example operation of a secondary battery system according to a preferred embodiment of the present invention.

FIG. 5 is a flowchart showing another example operation of the secondary battery system according to the present embodiment. In step S50, when the vehicle stops, the temperature of the secondary battery 16 is detected by the temperature sensor 24. When the ECU 34 judges that the temperature of the secondary battery 16 is greater than or equal to the high-temperature-side threshold value which is set in advance, in step S52, a number of times of switching ON of the ignition key counted by the counter is transmitted to the ECU 34 when the vehicle is stopped. The ECU 34 then judges whether or not the number of times of switching ON of the ignition key per day is less than a threshold value which is stored in advance. When the number of times of switching ON of the ignition key per day is less than the threshold value (when it is judged that the usage frequency of the vehicle is low), in step S54, the amount of remaining electric power of the secondary battery 16 is detected by the state of charge detecting device 36. In step S56, an amount of electric power to be transferred from the secondary battery 16 to the heat storage device 18 is determined by the ECU 34 based on the amount of remaining electric power of the secondary battery 16, and, in step S58, the electric power determined by the ECU 34 is transferred from the secondary battery 16 to the heat storage device 18.

Figure 6:
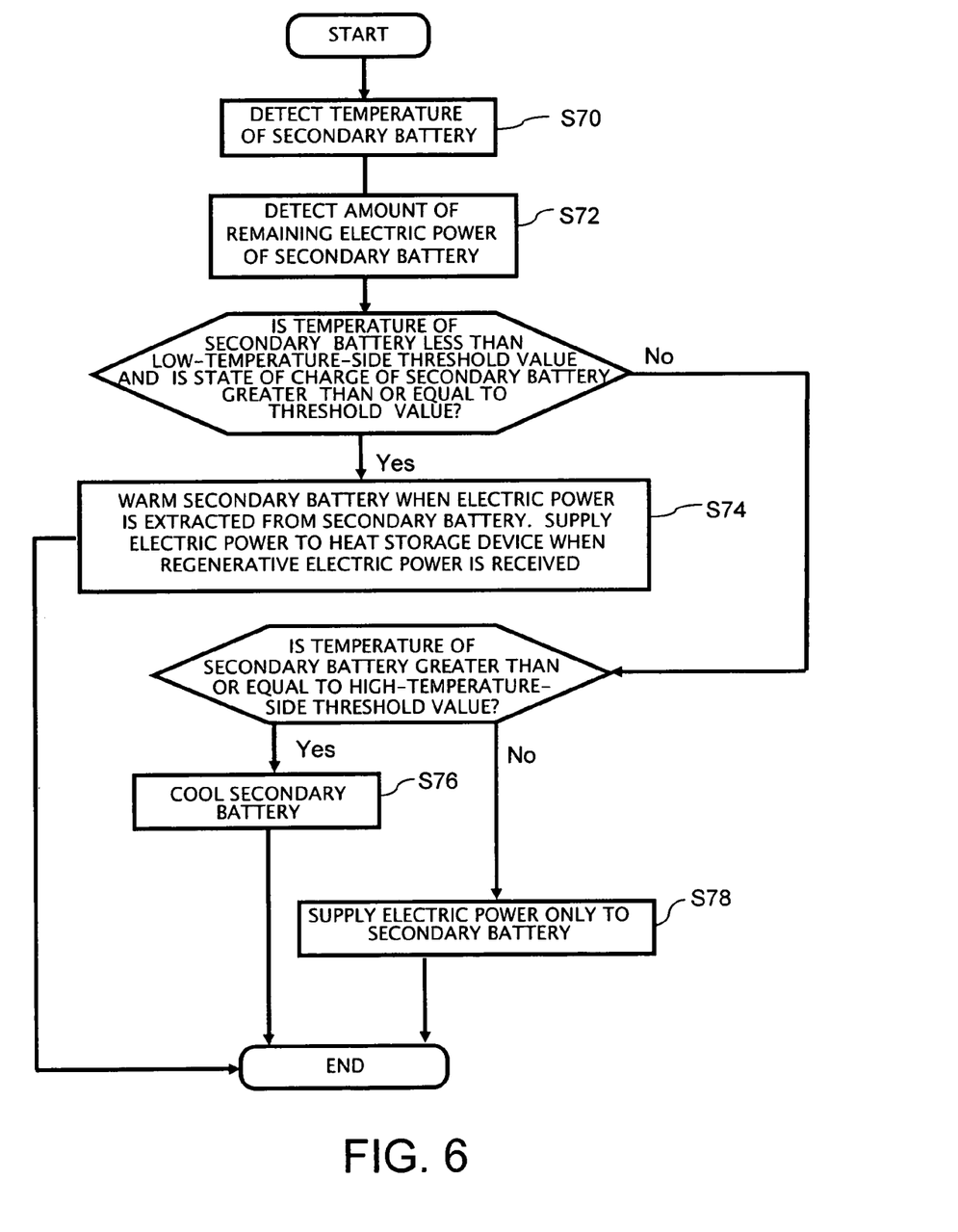
FIG. 6 is a flowchart showing yet another example operation of a secondary battery system according to a preferred embodiment of the present invention.

FIG. 6 is a flowchart showing another example operation of the secondary battery system according to the present embodiment. In step S70, the temperature of the secondary battery 16 is detected by the temperature sensor 24. In step S72, the amount of remaining electric power of the secondary battery 16 is detected by the state of charge detecting device 36. Then, the ECU 34 judges whether or not the detected temperature of the secondary battery 16 is less than the low-temperature-side threshold value which is stored in advance, and whether or not the detected amount of remaining electric power of the secondary battery 16 is greater than or equal to the threshold value which is stored in advance. In step S74, in the case where it is judged that the temperature of the secondary battery 16 is less than the low-temperature-side threshold value and the amount of remaining electric power is greater than or equal to the threshold value, when electric power is extracted from the secondary battery 16, the heat storage device 18 and the heat pump 20 are operated, the warming heat is supplied to the secondary battery 16, and the secondary battery 16 is warmed. When the regenerative electric power is received from the motor 10, the regenerative electric power from the motor 10 is supplied to the heat storage device 18. In the case where it is judged that the temperature of the secondary battery 16 is less than the low-temperature-side threshold value, but the amount of remaining electric power is less than the threshold value, when the regenerative electric power is received, the regenerative electric power is distributed to the secondary battery 16 and the heat storage device 18 by the ECU 34, similar to step S12 of FIG. 2.

When, on the other hand, the temperature of the secondary battery 16 is greater than or equal to the low-temperature-side threshold value and the amount of remaining electric power is less than the threshold value, the ECU 34 judges whether or not the detected temperature of the secondary battery 16 is greater than or equal to the high-temperature-side threshold value which is stored in advance. In S76, when it is judged that the temperature of the secondary battery 16 is greater than or equal to the high-temperature-side threshold value, the heat storage device 18 and the heat pump 20 are operated, the thermal energy of the heat storage device 18 is converted by the heat pump 20, to generate the cooling energy, and the secondary battery 16 is cooled. In step S78, if the temperature of the secondary battery 16 is greater than or equal to the low-temperature-side threshold value and less than the hightemperature-side threshold value and the amount of remaining electric power is less than the threshold value, when the secondary battery 16 receives the regenerative electric power from the motor 10, the ECU 34 supplies the regenerative electric power, for example, only to the secondary battery 16.

Figure 7:
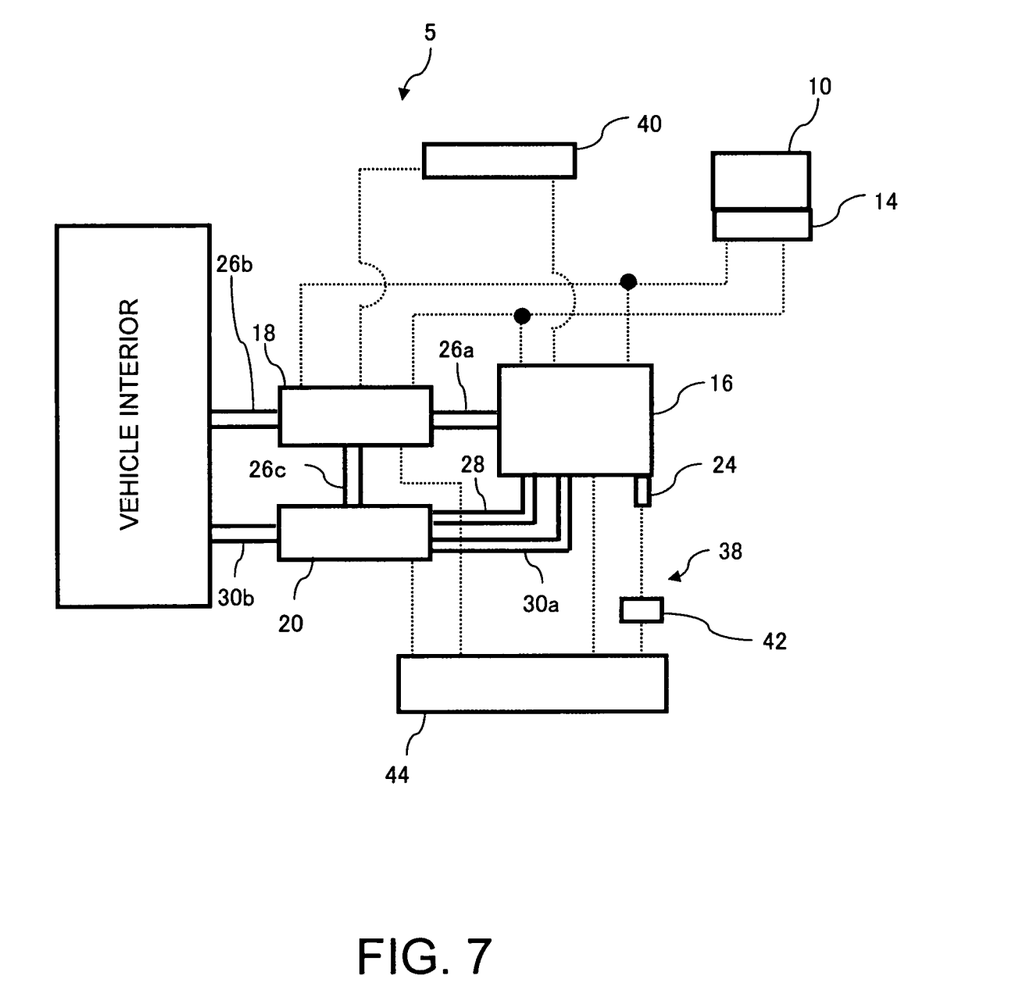
FIG. 7 is a schematic diagram showing an example structure of a vehicle according to another preferred embodiment of the present invention.

FIG. 7 is a schematic diagram showing an example structure of a vehicle according to another preferred embodiment of the present invention. In a vehicle 5 shown in FIG. 7, structures similar to those of the vehicle 1 of FIG. 1 are assigned the same reference numerals and will not be described again. A secondary battery system 38 shown in FIG. 7 comprises an electric power supply device 40 which supplies the electric power to the secondary battery 16 and the heat storage device 18, and a prediction device 42 which predicts a usage frequency of the heat storage device 18 based on a temperature history of the secondary battery 16.

Figure 8:
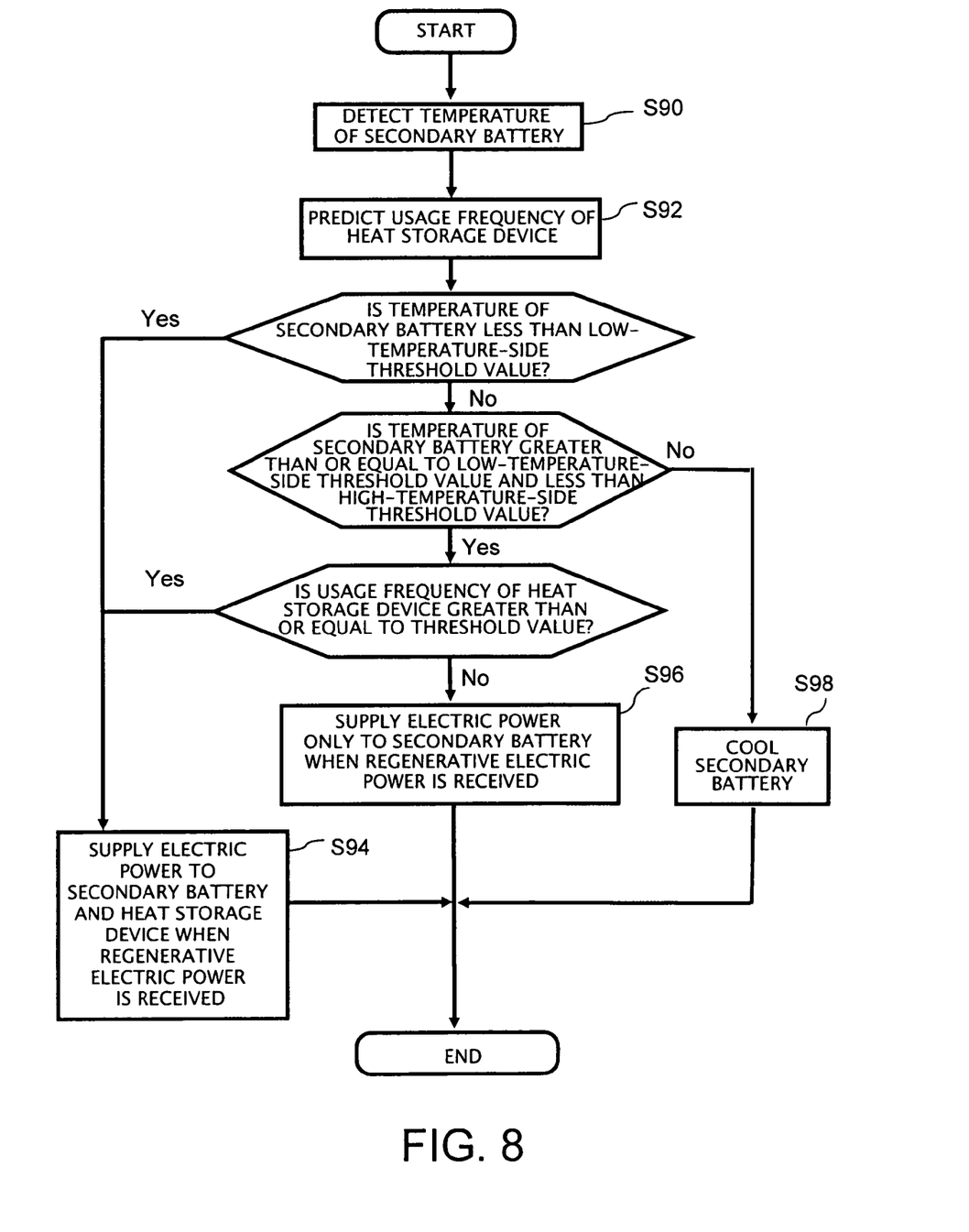
FIG. 8 is a flowchart showing an example operation of a secondary battery system according to a preferred embodiment of the present invention.

FIG. 8 is a flowchart showing an example operation of the secondary battery system according to the present embodiment. In step S90, the temperature of the secondary battery 16 is detected by the temperature sensor 24. In step S92, the prediction device 42 predicts the usage frequency of the heat storage device 18 based on the temperature history of the secondary battery 16. The usage frequency of the heat storage device 18 is represented, for example, by an energy supply frequency from the heat storage device 18 to the secondary battery 16. When the temperature of the secondary battery 16 is lower than a predetermined temperature threshold value, the warming heat is supplied from the heat storage device 18 to the secondary battery 16. When the temperature of the secondary battery 16 is higher than a predetermined temperature threshold value, the warming heat is supplied from the heat storage device 18 to the heat pump 20. Therefore, because of such a control, the frequency of supply of the warming heat from the heat storage device 18 can be calculated based on the history of the temperature of the secondary battery 16.

When the ECU 44 judges that the temperature of the secondary battery 16 is less than the low-temperature-side threshold value, processing proceeds to step S94, and, when the regenerative electric power is received from the motor 10, the ECU 44 limits the supply of electric power from the electric power supply device 40, and the regenerative electric power from the motor 10 is supplied to the secondary battery 16 and the heat storage device 18. When the electric power is extracted from the secondary battery 16, the heat storage device 18 and the heat pump 20 are operated, the warming heat is supplied to the secondary battery 16, and the secondary battery 16 is warmed.

When the ECU 44 judges that the temperature of the secondary battery 16 is greater than or equal to the low-temperature-side threshold value and less than the high-temperature-side threshold value and the usage frequency of the heat storage device 18 is greater than or equal to the threshold value, processing also proceeds to step S94, and, when the regenerative electric power from the motor 10 is received, the ECU 44 limits the supply of electric power from the electric power supply device 40, and the regenerative electric power from the motor 10 is supplied to the secondary battery 16 and the heat storage device 18.

When the ECU 44 judges that the temperature of the secondary battery 16 is greater than or equal to the low-temperature-side threshold value and less than the high-temperature-side threshold value, and the usage frequency of the heat storage device 18 is less than the threshold value, processing proceeds to step S96, and, when the secondary battery 16 receives the regenerative electric power from the motor 10, the ECU 44 supplies the regenerative electric power only to the secondary battery 16.

When the ECU 44 judges that the temperature of the secondary battery 16 is not less the low-temperature-side threshold value and is not in the range of greater than or equal to the low-temperature-side threshold value and less than the high-temperature-side threshold value (that is, when the ECU 44 judges that the temperature is greater than or equal to the high-temperature-side threshold value), processing proceeds to step S98, the heat storage device 18 and the heat pump 20 are operated, the thermal energy of the heat storage device 18 is converted by the heat pump 20, the cooling energy is generated, and the secondary battery 16 is cooled.

According to the present embodiment, the amount of supplied energy to the heat storage device 18 can be controlled without wastefully consuming the regenerative electric power, and, consequently, the running distance can be increased.

The invention claimed is:

1. A secondary battery system comprising:
    a secondary battery configured to receive regenerative electric power from a motor;
    a heat storage unit configured to convert a part of electric power stored in the secondary battery and the regenerative electric power from the motor into heat and store the heat in the heat storage unit, and which, when the electric power is extracted from the secondary battery, supply the stored heat to the secondary battery if a temperature of the secondary battery is less than a low-temperature-side threshold value which is set in advance; and
    an electric power distribution controller which, when the secondary battery receives the regenerative electric power from the motor, is configured to distribute the regenerative electric power from the motor to the secondary battery and the heat storage unit if the temperature of the secondary battery is less than the low-temperature-side threshold value and if electric power in the secondary battery is not at full capacity.

2. The secondary battery system according to claim 1, further comprising:
    a cooling-energy and warming-heat generation unit configured to convert thermal energy stored in the heat storage unit and generate cooling energy or amplify the thermal energy and generate warming heat, wherein
    the cooling-energy and warming-heat generation unit is configured to supply the warming heat to the secondary battery when the temperature of the secondary battery is less than the low-temperature-side threshold value which is set in advance, and supply the cooling energy to the secondary battery when the temperature of the secondary battery is greater than or equal to a high-temperature-side threshold value which is set in advance.

3. The secondary battery system according to claim 1, wherein the electric power distribution controller is configured to distribute the regenerative electric power from the motor to the secondary battery and the heat storage unit based on a remaining capacity of the battery.

4. A vehicle comprising:
    a motor which runs the vehicle;
    a secondary battery configured to receive regenerative electric power from the motor;
    a heat storage unit configured to convert a part of electric power stored in the secondary battery and the regenerative electric power from the motor into heat and store the heat in the heat storage unit, and which, when the electric power is extracted from the secondary battery, supply the stored heat to the secondary battery if a temperature of the secondary battery is less than a low-temperature-side threshold value which is set in advance; and an electric power distribution controller which, when the secondary battery receives the regenerative electric power from the motor, is configured to distribute the regenerative electric power from the motor to the secondary battery and the heat storage unit if the temperature of the secondary battery is less than the low-temperature-side threshold value and if electric power in the secondary battery is not at full capacity.

5. The vehicle according to claim 4, further comprising:
a cooling-energy and warming-heat generation unit configured to convert thermal energy stored in the heat storage unit and generate cooling energy or amplify the thermal energy and generate warming heat, wherein
the cooling-energy and warming-heat generation unit is configured to supply the warming heat to the secondary battery when the temperature of the secondary battery is less than the low-temperature-side threshold value which is set in advance, and supply the cooling energy to the secondary battery when the temperature of the secondary battery is greater than or equal to a high-temperature-side threshold value which is set in advance.

6. The vehicle according to claim 5, further comprising:
an amount-of-electric-power controller configured to supply a part of the electric power of the secondary battery to the heat storage unit based on a usage frequency of the vehicle and the temperature of the secondary battery when the vehicle is stopped, wherein
the amount-of-electric-power controller is configured to supply a part of the electric power of the secondary battery to the heat storage unit when the temperature of the secondary battery is greater than or equal to a threshold value which is set in advance and the usage frequency of the vehicle is less than a threshold value which is set in advance, when the vehicle is stopped.

7. The vehicle according to claim 4, further comprising:
a state of charge detecting unit configured to detect an amount of remaining electric power of the secondary battery, wherein
the electric power distribution controller is configured to distribute the regenerative electric power from the motor to the heat storage unit when the amount of remaining electric power of the secondary battery detected by the state of charge detecting unit is greater than or equal to a threshold value which is set in advance.

8. The vehicle according to claim 5, further comprising:
a state of charge detecting unit configured to detect an amount of remaining electric power of the secondary battery, wherein
the electric power distribution controller is configured to distribute the regenerative electric power from the motor to the heat storage unit when the amount of remaining electric power of the secondary battery detected by the state of charge detecting unit is greater than or equal to a threshold value which is set in advance.

9. The vehicle according to claim 6, further comprising:
a state of charge detecting unit configured to detect an amount of remaining electric power of the secondary battery, wherein
the electric power distribution controller is configured to distribute the regenerative electric power from the motor to the heat storage unit when the amount of remaining electric power of the secondary battery detected by the state of charge detecting unit is greater than or equal to a threshold value which is set in advance.

10. The vehicle according to claim 4, further comprising:
an electric power supply unit configured to supply electric power to the secondary battery and the heat storage unit; and
a prediction unit configured to predict a usage frequency of the heat storage unit based on a temperature history of the secondary battery, wherein
when the usage frequency of the heat storage unit predicted by the prediction unit is less than a threshold value which is set in advance, the electric power distribution controller is configured to limit supply of electric power to the secondary battery and the heat storage unit by the electric power supply unit, and distribute the regenerative electric power from the motor to the heat storage unit.

11. The vehicle according to claim 5, further comprising:
an electric power supply unit configured to supply electric power to the secondary battery and the heat storage unit; and
a prediction unit configured to predict a usage frequency of the heat storage unit based on a temperature history of the secondary battery, wherein
when the usage frequency of the heat storage unit predicted by the prediction unit is less than a threshold value which is set in advance, the electric power distribution controller is configured to limit supply of electric power to the secondary battery and the heat storage unit by the electric power supply unit, and distribute the regenerative electric power from the motor to the heat storage unit.

12. The vehicle according to claim 6, further comprising:
an electric power supply unit configured to supply electric power to the secondary battery and the heat storage unit; and
a prediction unit configured to predict a usage frequency of the heat storage unit based on a temperature history of the secondary battery, wherein
when the usage frequency of the heat storage unit predicted by the prediction unit is less than a threshold value which is set in advance, the electric power distribution controller is configured to limit supply of electric power to the secondary battery and the heat storage unit by the electric power supply unit, and distribute the regenerative electric power from the motor to the heat storage unit.

13. The vehicle according to claim 4, wherein the electric power distribution controller is configured to distribute the regenerative electric power from the motor to the secondary battery and the heat storage unit based on a remaining capacity of the battery.

* * * * *